(12) United States Patent  
Aicklen et al.

(10) Patent No.: US 7,145,867 B2
(45) Date of Patent: Dec. 5, 2006

(54) SYSTEM AND METHOD FOR SLOT DEFLECTION ROUTING

(75) Inventors: Gregory H. Aicklen, Richardson, TX (US); Lakshman S. Tamil, Plano, TX (US)

(73) Assignee: Lighthouse Capital Partners IV, LP, Greenbrae, CA (US)

( * ) Notice: Subject to any disclaimer, the term of this patent is extended or adjusted under 35 U.S.C. 154(b) by 969 days.

(21) Appl. No.: 10/114,564

(22) Filed: Apr. 2, 2002

(65) Prior Publication Data

US 2003/0067653 A1    Apr. 10, 2003

Related U.S. Application Data

(63) Continuation-in-part of application No. 09/698,666, filed on Oct. 27, 2000, now Pat. No. 6,665,495.

(51) Int. Cl.
*H04L 12/46* (2006.01)
(52) U.S. Cl. ........................ 370/228; 370/237
(58) Field of Classification Search .......... 370/216, 370/222, 403; 359/139
See application file for complete search history.

(56) References Cited

U.S. PATENT DOCUMENTS

| | | | | |
|---|---|---|---|---|
| 5,253,248 A | * | 10/1993 | Dravida et al. | 370/228 |
| 5,327,552 A | * | 7/1994 | Liew | 714/4 |
| 5,416,769 A | | 5/1995 | Karol | 370/60 |
| 5,469,284 A | * | 11/1995 | Haas | 398/54 |
| 5,477,530 A | * | 12/1995 | Ahmadi et al. | 370/237 |
| 5,486,943 A | | 1/1996 | Sasayama et al. | 359/123 |
| 5,617,413 A | * | 4/1997 | Monacos | 370/400 |
| 5,734,486 A | * | 3/1998 | Guillemot et al. | 398/54 |

(Continued)

FOREIGN PATENT DOCUMENTS

EP    0 849 916 A1    6/1998

(Continued)

OTHER PUBLICATIONS

Borgonovo et al. (Unslotted deflection routing in all-optical networks; Global Telecommunications Conference, 1993, including a Communications Theory Mini-Conference. Technical Program Conference Record, IEEE in Houston. GLOBECOM '93., IEEE Nov. 29- Dec. 2.*

(Continued)

*Primary Examiner*—Hassan Kizou
*Assistant Examiner*—Salman Ahmed
(74) *Attorney, Agent, or Firm*—Sprinkle IP Law Group

(57) ABSTRACT

The present invention provides a system and method for slot deflection routing of optical data packets. The method of the present invention includes the steps of establishing a schedule pattern that includes a plurality of time slots. The schedule pattern includes at least one time slot in which an ingress edge unit can communicate with a destination egress edge unit, at least one time slot in which the ingress edge unit can communicate with a intermediate edge unit, and at least one time slot in which the intermediate edge unit can communicate with the destination egress edge unit. The present invention also includes receiving a data packet at the ingress edge unit and determining if the schedule pattern allocates sufficient bandwidth to send the data packet from the ingress edge unit to the destination egress edge unit without deflecting the data packet through an intermediate edge unit. If enough bandwidth has been allocated, the data packet can be sent to the destination edge unit from the ingress edge unit without deflection. Alternatively, if enough bandwidth has not been allocated, the data packet can be deflected to an intermediate edge unit prior to being communicated to the destination egress edge unit.

20 Claims, 4 Drawing Sheets

U.S. PATENT DOCUMENTS

| | | | |
|---|---|---|---|
| 5,737,106 A | | 4/1998 | Sansonetti et al. .......... 359/140 |
| 5,848,055 A | * | 12/1998 | Fedyk et al. ................. 370/228 |
| 5,978,359 A | | 11/1999 | Caldara et al. |
| 6,345,040 B1 | * | 2/2002 | Stephens et al. ............ 370/232 |
| 6,834,310 B1 | * | 12/2004 | Munger et al. ............. 709/232 |
| 2002/0101869 A1 | * | 8/2002 | Garcia-Luna-Aceves et al. .............. 370/389 |
| 2003/0030866 A1 | * | 2/2003 | Yoo ........................... 359/128 |

FOREIGN PATENT DOCUMENTS

| | | |
|---|---|---|
| WO | WO 95/30318 A2 | 11/1995 |
| WO | WO 00/42811 A1 | 7/2000 |

OTHER PUBLICATIONS

Chevalier et al. (A new packet routing strategy for ultra-fast photonic networks Dept. of Electron. & Electr. Eng., Strathclyde Univ., Glasgow; This paper appears in: Global Telecommunications Conference, 1998. GLOBECOM 98. The Bridge to Global Integratio.*

Bannister et al. (A performance model of deflection routing in multibuffer networks with nonuniform traffic Networking, IEEE/ACM Transactions on vol. 3, Issue 5, Oct. 1995 pp. 509-520).*

International Search Report for PCT/US01/51237, Mailed Mar. 20, 2003.

Kannan, et al. "*A High Bandwidth Space-Time-Wavelength Multiplexed Optical Switching Network*" Proceedings of the IEEE Infocom '97, Los Alamitos, CA, Apr. 7-12, 1997.

McKeown, et al. "*Tiny Tera: A Packet Swith Core*" IEEE Micro, IEEE Inc, New York, vol. 17, No. 1, pp. 26-33, Jan. 1997.

G. Depovere, et. al., Philips Research Laboratories, "*A Flexible Cross-Connect Network Using Multiple Object Carriers,*" Date Unknown, All Pages.

John M. Senior, et al., SPIE—The International Society for Optical Engineering, "*All-Optical Networking 1999: Architecture, Control, and Management Issues*" vol. 3843, pp. 111-119, dated Sep. 19-21, 1999.

Jonathan S. Turner, Journal of High Speed Networks 8 (1999) 3-16 IOS Press, "*Terabit Burst Switching*", pp. 3-16.

Ken-ichi Sato, IEEE Journal on Selected Areas in Communications, vol. 12, No. 1, Jan. 1994 "*Network Performance and Integrity Enhancement with Optical Path Layer Technologies*", pp. 159-170.

F. Callegati, et al., Optical Fiber Technology 4, 1998 "*Architecture and Performance of a Broadcast and Select Photonic Switch\**", pp. 266-284.

Soeren Lykke Danielsen, et al., "*WDM Packet Switch Architectures and Analysis of the Influence of Tuneable Wavelength Converters on the Performance*".

Soeren L. Danielsen, et al., IEEE Photonics Technology Letters, vol. 10, No. 6, Jun. 1998 "*Optical Packet Switched Network Layer Without Optical Buffers*".

John M. Senior, et al., SPIE—The International Society of Optical Engineering, *All-Optical Networking: Architecture, Control and Management Issues* dated Nov. 3-5, 1998, vol. 3531, pp. 455-464.

M.C. Chia, et al., Part of SPIE Conference on All-Optical Networking: Architecture, Control and Management Issues, Nov. 1998, "*Performance of Feedback and Feedforward Arrayed—Waveguide Gratings-Based Optical Packet Switches with WDM Inputs/Outputs*".

\* cited by examiner

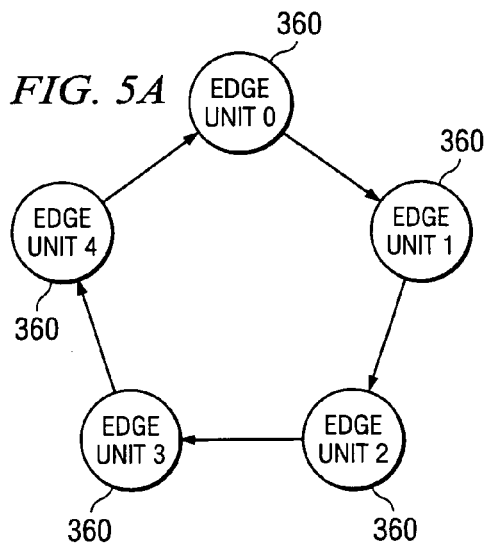
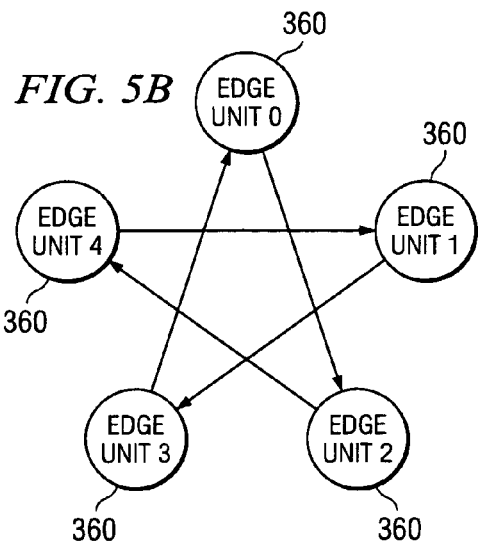
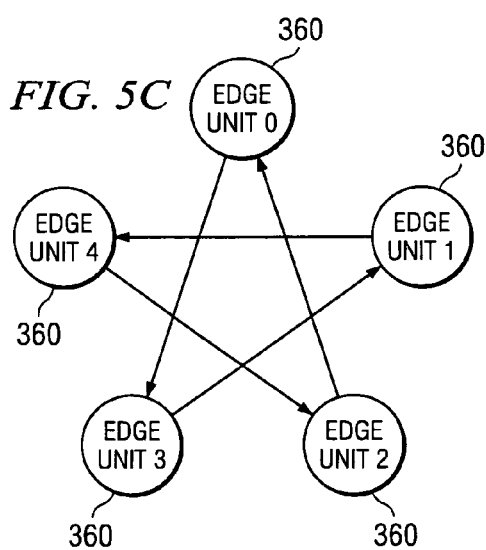
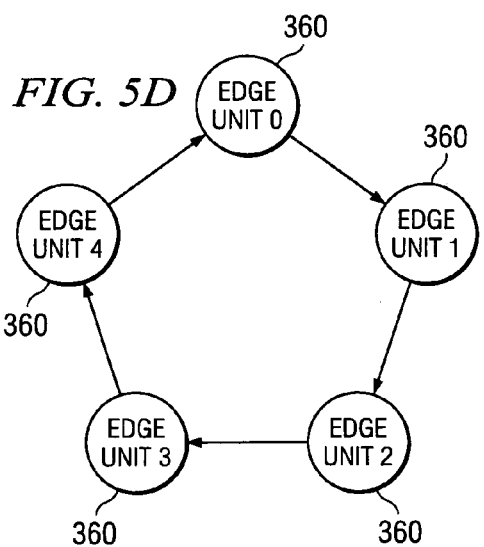

SYSTEM AND METHOD FOR SLOT DEFLECTION ROUTING

RELATED INFORMATION

This application is a continuation in part of U.S. patent application Ser. No. 09/698,666, entitled "Non-Blocking, Scalable Optical Router Architecture and Method for Routing Optical Traffic," filed Oct. 27, 2000, now U.S. Pat. No. 6,665,495 which is hereby fully incorporated by reference herein.

TECHNICAL FIELD OF THE INVENTION

The present invention relates generally to the routing of data packets and more particularly to a system and method for slot deflection routing of data packets in an optical router.

BACKGROUND OF THE INVENTION

The emergence of the Internet and the reliance by businesses and consumers on the transfer of data in an increasing number of daily activities requires that telecommunications networks and components deliver ever greater amounts of data at faster speeds. In telecommunications networks, data packets can be directed through the network by a series of routers and switches. At each router/switch in the network, data packets must be routed from an incoming transmission line to the proper outgoing transmission line so that data packets can be correctly communicated through the network. In current systems and methods for routing optical data packets at a router/switch, optical data packets are transferred from ingress data ports to the appropriate egress data ports via optical cross-connects or other such devices. In these systems, when a data packet arrives at an optical router/switch, the data packet is sent directly from an ingress edge unit through a cross-connect (or similar device) to the appropriate egress edge unit based on the routing information contained in the data packet's header.

In current routers, however, the connection between an ingress edge unit and egress edge unit typically does not change. Therefore, if there is an unexpected increase in traffic going to a particular egress edge unit, current routers cannot effectively allocate more router capacity to links between the ingress edge unit and the egress edge unit to which the increased traffic is bound. Additionally, in current routers/switches, data traffic can not be routed to intermediate edge units in the router/switch prior to being sent to the destination egress edge unit. Because bandwidth can not be reallocated between ingress interface ports and egress interface ports and data traffic can not be rerouted to intermediate edge units, current routers/switches have no option but to drop excess traffic. Furthermore, because data traffic cannot be rerouted to the intermediate edge units, if there is a fault on the links between the ingress edge unit and egress edge unit, data traffic bound for the egress edge unit must also be dropped. Thus, current routers/switches can not adequately compensate for permanent or transient increases in traffic or for the failure of links within the router.

SUMMARY OF THE INVENTION

The present invention provides an optical data packet routing system and method that substantially eliminates or reduces disadvantages and problems associated with previously developed optical data packet systems and methods.

More specifically the present invention provides a system and method for slot deflection routing of optical data packets. The method of the present invention includes the step of establishing a schedule pattern that includes a plurality of time slots. The schedule pattern includes at least one time slot in which an ingress edge unit can communicate with a destination egress edge unit, at least one time slot in which the ingress edge unit can communicate with a intermediate edge unit, and at least one time slot in which the intermediate edge unit can communicate with the destination egress edge unit. The present invention also includes receiving a data packet at the ingress edge unit and determining if the schedule pattern allocates sufficient bandwidth to send the data packet from the ingress edge unit to the destination egress edge unit without deflecting the data packet through an intermediate edge unit. If enough bandwidth has been allocated, the data packet can be sent to the destination edge unit from the ingress edge unit without deflection. Alternatively, if enough bandwidth has not been allocated based on actual data flows, the data packet can be deflected to an intermediate edge unit prior to being communicated to the destination egress edge unit.

The present invention provides substantial technical advantages over previously developed systems and methods of routing optical data packets by allowing data packets on saturated links between edge units to be rerouted rather than being dropped.

The present invention provides another advantage over previously developed methods and systems of routing optical data packets by allowing a new schedule pattern to be established in response to increases in traffic without dropping data packets.

The present invention provides yet another advantage over previously developed systems and methods of routing optical data packets by rerouting data packets around faults in optical routers or switches.

The present invention provides yet another substantial technical advantage over previously developed systems and methods of routing optical data packets by decreasing the underutilization of links in an optical router or switch.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 5A, 5B, 5C, 5D, 5E and 5F illustrate the flow of data packets between edge units in an optical router for one embodiment of a weighted round robin schedule pattern according to the present invention;

DETAILED DESCRIPTION OF THE INVENTION

Embodiments of the present invention are illustrated in the FIGUREs, like numerals being used to refer to like and corresponding parts of the various drawings.

The present invention provides a system and method for routing data packets through an intermediate edge unit (e.g., non-destination edge unit) at a router/switch prior to routing the data packet to its destination edge unit. Because data packets can be re-routed to intermediate edge units based on the traffic conditions being experienced by the router, embodiments of present systems can provide effective traffic and fault management. Furthermore, by being able to allocate capacity to links in the router with more traffic, embodiments of the present invention can increase the traffic fill ratios experienced by the router.

Figure 1:
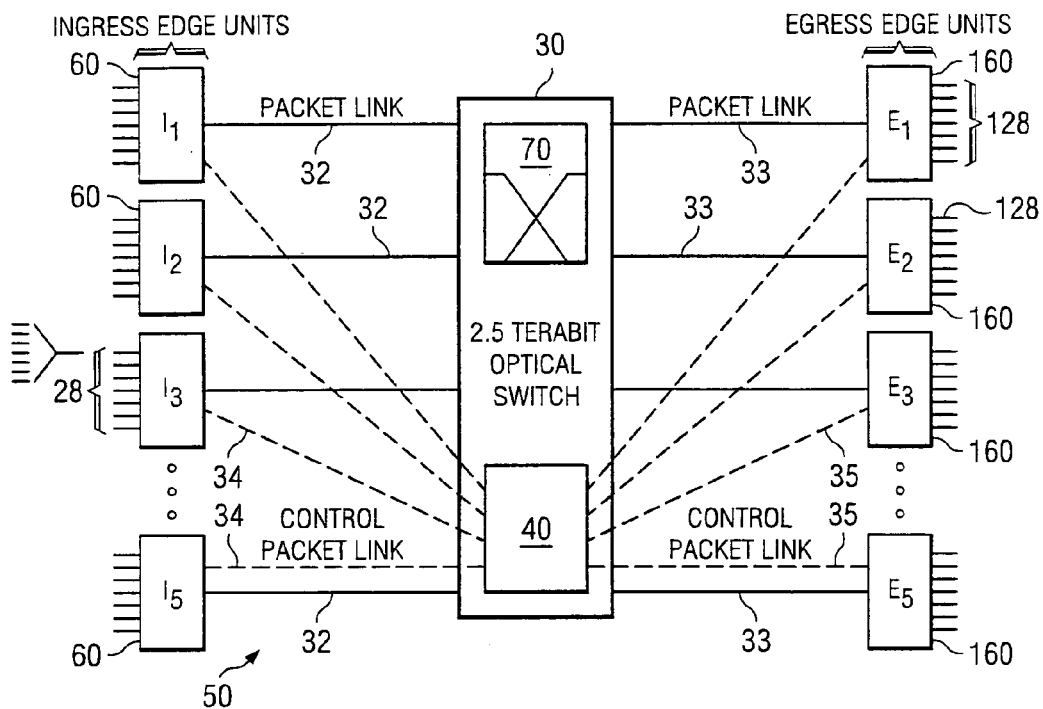
FIG. 1 shows one embodiment of an optical router configurable to provide slot deflection routing according to the present invention.

FIG. 1 is a diagrammatic representation of one embodiment of an optical router 50 configurable to provide slot deflection routing according to the present invention. The optical router 50 includes an optical switch core 30 that can further comprise an optical switch fabric 70 and a core controller 40 that manages the routing of data to the optical switch fabric 70. A plurality of ingress edge units 60 link to the switch fabric 70 via a plurality of ingress packet links 32 and link to the core controller 40 via a plurality of ingress control packet links 34 and a plurality of egress edge units 160 link to the optical switch fabric 70 via a plurality of egress packet links 33 and link to the core controller 40 via a plurality of egress control packet links 35. The packet links 32 and control packet links 33 can both comprise WDM fibers or ribbons. Thus, the optical switch core 30 is interconnected to a plurality of edge units 60 and 160 that interface with the optical switch core 30. It should be understood that the control packet links, and packet links, can either comprise separate physical fiber links or can combine a single physical fiber link for both the control and data path. Each ingress edge unit 60 and each egress edge unit 160 can contain many ingress and egress ports of different types, respectively, that can connect to a range of other optical network elements such as smaller switches, routers, cross-connects and/or transmission equipment that may require consolidation of large amounts of optical data. While the ingress edge units and egress edge units are shown separately for the sake of simplicity, it should be understood that ingress edge units and egress edge units can be combined into a single physical edge unit. Additionally, switch core 30 can comprise single switch core or, alternatively, can comprise a stack of switch cores or a multiple plane switch core.

In operation, the ingress edge unit 60 can receive optical data packets and, optionally, can aggregate data packets in electrical form into egress addressable superpackets for transmission over the ingress packet link 32 through the optical switch core 30 and over egress packet link 33 to egress edge unit 160. Incidentally, a superpacket, as used herein, is an aggregated optical data packet that includes the data from converted data packets arriving at ingress edge unit 60 that are intended for the same egress destination. Each ingress edge unit 60 also connects to core controller 40 via ingress control packet links 34 that carry control data packets to and from the core controller 40 to provide control data from each of the ingress edge units 60 that are used by the core controller 40 to perform the switch and routing management functions of optical router 50.

Each ingress edge unit, as shown in FIG. 1, can receive data from input/output line 28 that interfaces between ingress edge unit 60 and other devices in the optical network. The input/output lines 28 can be, for example, standard network interface port cards, e.g., OC-48 packet over SONET port cards, OC-192 packet over SONET port cards, gigabyte Ethernet port cards, etc., or DWDM interface port cards for aggregating multiple signals, or equally functional input/output units. Thus, the port itself can process multiple signal types aggregated into one or more input lines. The input/output lines 28 simply need to have the capacity to receive and send the amount of data provided over a data link 28.

FIG. 1 shows a specific embodiment of a router 50 for implementing the present invention. However, it should be understood that the numerical values ratios, etc., are exemplary only at that the present invention can be utilized with any number of optical router/switch configurations ingress edge units and egress edge units, and in any capacity of packet length. In the embodiment shown in FIG. 1, there are five ingress edge units (labeled I1, I2, I3 . . . I5), and five corresponding egress edge units 160 (labeled E1, E2, E3 . . . E5). The optical router 50 of FIG. 1 can allow all the data or any fraction thereof to be transferred from the ingress to egress edges in a non-blocking manner (e.g., all of the data from ingress edge unit I1 can go to egress edge unit E5 while at the same time all of the data from ingress edge unit I2 can go to egress edge unit E2 and so on). Thus, every data packet arriving at ingress edge unit 60 will be routed to an egress edge unit 160 without contention, so long as the capacities of each of the ingress packet links 32 and egress packet links 33 are not exceeded. In other words, the egress packet link 33 capacity to a particular egress edge unit 160 cannot be exceeded. The core controller 40 manages this control feature to insure that the egress packet link 33 capacity is not exceeded. In this manner, any portion of the input data at any ingress unit 60 can be routed simultaneously to any egress edge unit 160, so long as the above control feature is followed.

Figure 2:
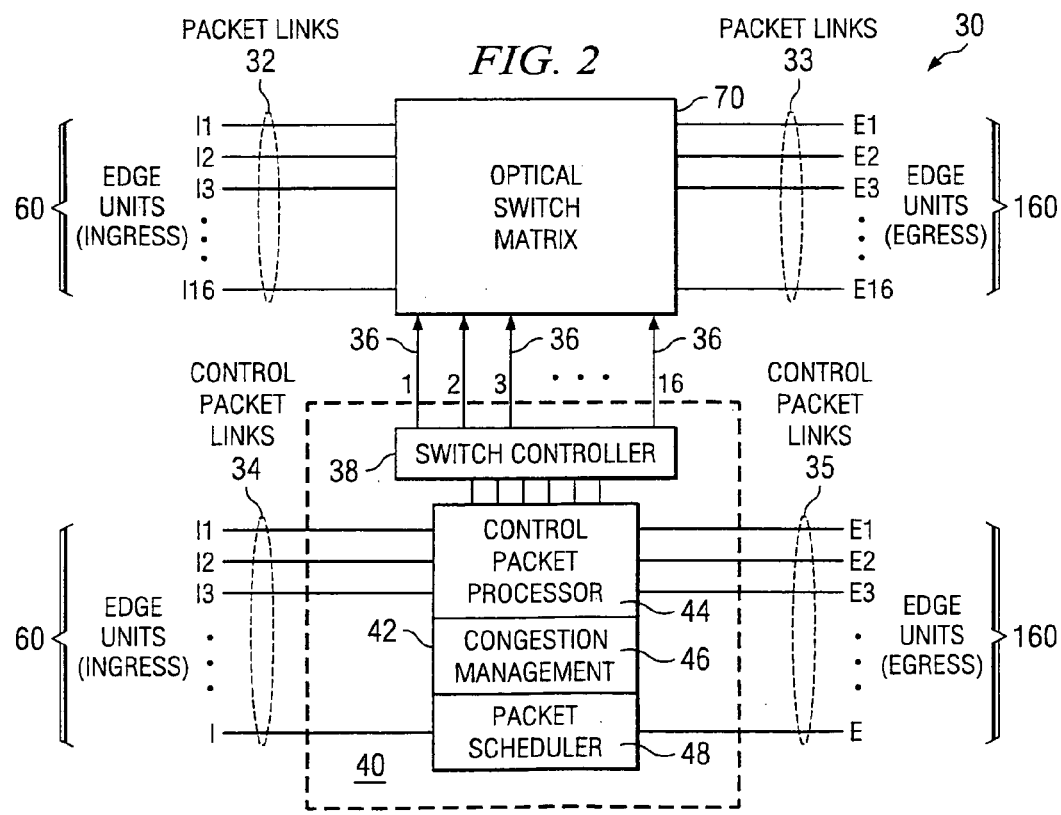
FIG. 2 shows a non-blocking embodiment of an optical switch core for the optical router of FIG. 1.

FIG. 2 shows a non-blocking embodiment of an optical switch core 30 of FIG. 1 in further detail. As previously described, the optical switch core 30 can include optical switch fabric 70 connected to edge unit 60 via packet link and a core controller 40 connected to edge units via control packet links. As shown in FIG. 2, core controller 40 can comprise a packet scheduler 42, which is the portion of core controller 40 which communicates with the ingress edge unit 60 through the ingress control packet links 34 and with the egress edge unit 160 to the egress control packet links 35, and the switch controller 38 that is in communication between the packet scheduler 42 and the optical switch fabric 70 to coordinate the actual switching within the optical switch fabric 70 based on the information processed from the ingress edge unit 60. The packet scheduler 42 can be a single unit that performs the packet scheduling and control or can comprise multiple modules. In an alternative embodiment, the packet scheduler can further comprise separate modules, including control packet processor module 44, a congestion management module 46 and a scheduler module 48. In the context of the present invention, the congestion management perform by congestion manage ment module 46 can include monitoring, reserving and allocating a path through the router 50 to avoid congestion. The switch controller 38 may be an electrical control device. Switch controller 38 can communicate with optical switch fabric 70 through one or more switch links 36 through which the core controller 40 applies a scheduled pattern to the optical switch fabric 70. Scheduled patterns will be discussed in greater detail below.

Optical router 50 can allow the non-blocking feature by utilization of optical switch fabric 70 to allow the flow of packets or superpackets without contention within the optical fabric. In order to assure that the transmission to a given egress unit 160 is accomplished without collision or data loss, the switch core controller 40 can communicate with each ingress edge unit 60 over ingress control packet links 34 in order to determine the incoming data destination requirements and schedule transmission of data packets or superpackets between ingress and egress edge interface units to avoid collision or congestion. The core controller 40 can monitor the ingress edge units 60 via ingress control packet links 34 to obtain management information, potentially including bandwidth, delay and quality of service information to schedule a transmission of packets or superpackets from the ingress edge units 60. The core controller 40 can also monitor the egress edge units 160 via egress control packet links 35 to insure the proper packets or superpackets arrive at each ingress edge unit 160 at the proper time. On the ingress edge unit 60 side, the packet scheduler 42 can receive and process control packet data from the ingress edge unit 60 over ingress control packet links 34 (e.g., using control packet processor 44). This information can be used by the congestion management module 46 to manage congestion along both the ingress packet link 32 and along the egress packet links 33. Based on the congestion management, the packet scheduler 42 (e.g., using scheduler module 48) can schedule the transmission of packets or superpackets to be switched through the optical switch fiber 70 to the appropriate egress packet link 33 destined for a particular egress edge unit 160.

Based on the control data information received from the ingress edge unit 60 regarding the amount of and destinations for the superpackets being built or data packets being communicated, packet scheduler 42 can develop a schedule pattern that is delivered to switch controller for by use by the switch controller 38 to open and close paths through optical switch 70. The pattern can be established so as to avoid congestion and/or overload of the egress packet links 33 between optical switch 70 and the egress edge unit 160. The pattern can be established using any number of data characteristics, including delay, type of data or quality of service requirements.

Figure 3:
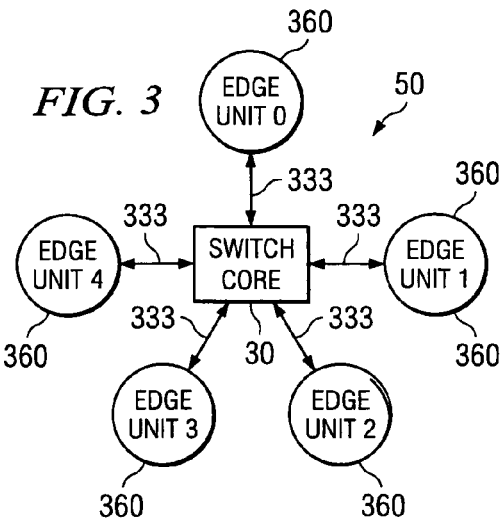
FIG. 3 shows an embodiment of router 50 that can utilize slot routing according to the present invention.
Figure 4A:
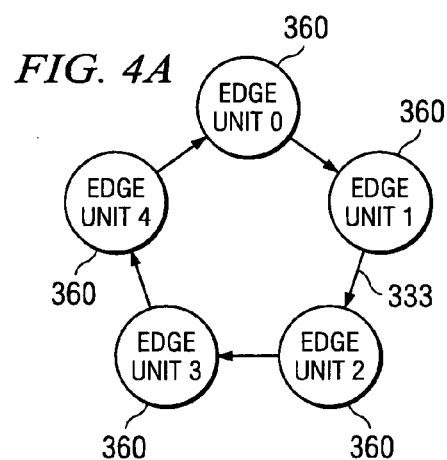
FIGS. 4A, 4B, 4C and 4D illustrate the flow of data packets between edge units in an optical router for one embodiment of a schedule pattern according to the present invention.
Figure 4B:
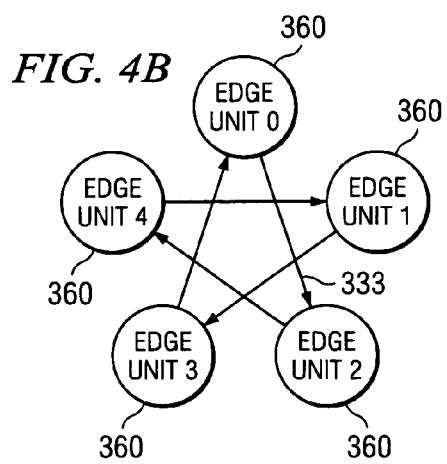
Figure 4C:
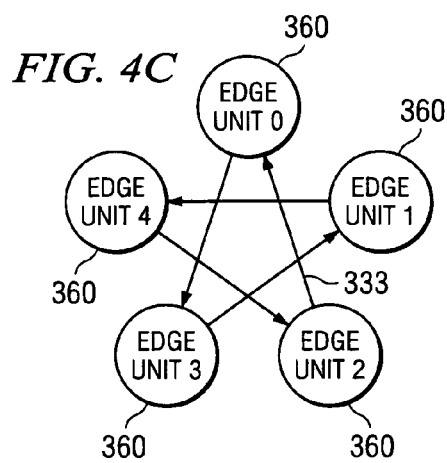
Figure 4D:
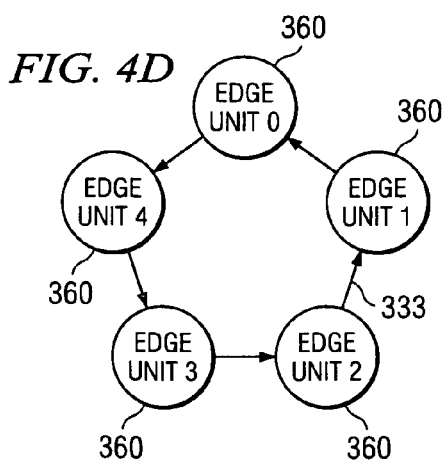

In one embodiment of the present invention, packet scheduler 42 can apply either slot routing or slot deflection routing. In slot routing, (also referred to as pure slot routing) scheduler 42 can create a schedule pattern of time slots in which each ingress edge unit can communicate with each egress edge unit. FIG. 3 shows an embodiment of router 50 to illustrate slot routing. FIG. 3 shows multiple edge units 360 connected to one another through the optical switch core 30. Each edge unit 360 can comprise both an ingress edge unit 60 and an egress edge unit 160 so that the functionality of the ingress edge unit 60 and egress edge unit 160 are combined within a single edge unit 360. Each edge unit 360 can be bi-directionally linked to receive input from and send output to optical core 30. With reference to FIG. 1, the output path over packet link 333 from the ingress function within edge unit 360 is an ingress packet link 32, and the input path over packet link 333 from the egress function within edge unit 360 is an egress packet link 33. With regards to FIG. 3, in ordinary slot routing, a packet or superpacket from edge unit four ("EU4") that is intended for edge unit two ("EU2") could be routed from EU4 via packet link 333 (i.e., an ingress packet link 32) to optical switch core 30. At the optical switch core, the packet or superpacket could be switched onto packet link 333 (i.e., and egress packet link 33) connected to EU2 and forwarded to EU2 for further processing. In order to prevent congestion or conflict between data packets or superpackets traveling from ingress edge units to egress edge units, packet scheduler 42 can create a schedule pattern of time slots so that no two ingress edge units communicate with the same egress edge unit at the same time.

Table 1 provides and exemplary embodiment of a schedule pattern according to the present invention. The left-hand column identifies each source edge unit 360 (labeled node) and the remaining columns indicate which edge unit 360 will receive a packet or superpacket from the source node during a particular time slot. Thus, for example, during time slot T0, switch controller 37 can configure optical core 30 so that node 0 (e.g., edge unit zero or "EU0")communicates with node 1 (e.g., edge unit one or "EU1"), in time slot T1, node 0 communicates with node 2 (e.g., EU2), in time slot T2, node 0 communicates with node 3 (e.g., edge unit three or "EU3"), and in time slot T3, node 0 communicates with node 4 (e.g., EU4), and so on.

TABLE 1

Slot Routing Example 1: Round Robin Schedule

| Node | Slot T0 | Slot T1 | Slot T2 | Slot T3 |
|---|---|---|---|---|
| 0 | 1 | 2 | 3 | 4 |
| 1 | 2 | 3 | 4 | 0 |
| 2 | 3 | 4 | 0 | 1 |
| 3 | 4 | 0 | 1 | 2 |
| 4 | 0 | 1 | 2 | 3 |

FIG. 4 illustrates routing according to the round robin schedule of Table 1. Thus, as shown in FIG. 4A, each edge unit 360 can send data to the edge unit immediately clockwise during time slot T0. As shown in FIG. 4B, during time slot T1, each edge unit 360 can send data to the edge unit 360 that is two edge units away in the clockwise direction. FIG. 4C uses the same pattern as 4B but in the opposite direction and FIG. 4D uses the same pattern as FIG. 4A in the opposite direction. This pattern can persist until the cycle ends, at which time each edge unit 360 has transferred one packet or superpacket to each of the other four edge units 360 and, similarly, can have received one superpacket or packet from each of the other four edge units 360. It should be noted that FIGS. 4A–4D do not show optical core 30 for the sake of simplicity, but data packets can still be routed through optical core 30.

With regards to Table 2 below, the round robin schedule pattern of Table 1 results in evenly distributed switch capacity over link 333 between the edge units 360. For example, in each cycle, node 0 communicates with node 1 once, node 2 once, node 3 once and node four once. Thus, node 0 communicates with each of the other four nodes twenty-five percent (25%) of the cycle time. As shown in Table 2, 0.250 of the available bandwidth in a cycle for node 0 to communicate with other nodes (i.e., edge units) is allocated for node 0 to communicate with node 1, 0.250 is allocated for node 0 to communicate with node 2, etc., resulting in uniformly allocated bandwidth.

TABLE 2

Distribution of Link Capacity for Round Robin Schedule

| Node | 0 | 1 | 2 | 3 | 4 |
|---|---|---|---|---|---|
| 0 | — | 0.250 | 0.250 | 0.250 | 0.250 |
| 1 | 0.250 | — | 0.250 | 0.250 | 0.250 |
| 2 | 0.250 | 0.250 | — | 0.250 | 0.250 |
| 3 | 0.250 | 0.250 | 0.250 | — | 0.250 |
| 4 | 0.250 | 0.250 | 0.250 | 0.250 | — |

However, it may be that traffic is unevenly distributed across the links 333 between the various nodes 360. In such a case, a more complex schedule pattern than the simple round robin pattern presented in Table 1 may be necessary to fully utilize bandwidth efficiency. An example of a more complex schedule pattern for the five edge unit 360 configuration is shown in Table 3.

TABLE 3

Slot Routing Example 2: Weighted Round Robin Schedule

| Node | Slot T0 | Slot T1 | Slot T2 | Slot T3 | Slot T4 | Slot T5 |
|---|---|---|---|---|---|---|
| 0 | 1 | 2 | 3 | 4 | 2 | 3 |
| 1 | 2 | 3 | 4 | 0 | 4 | 4 |
| 2 | 3 | 4 | 0 | 1 | 0 | 0 |
| 3 | 4 | 0 | 1 | 2 | 1 | 1 |
| 4 | 0 | 1 | 2 | 3 | 3 | 2 |

In this case, the schedule pattern is six slots long, rather than the four slots of Table 1 and all of the edge units 360 are allocated at least one slot to send packets or superpackets to each of the other four edge unit 360. Assume that traffic is heavier on the links between node 0 and node 2, and node 0 and node 3 than on the links between node 0 and the other nodes (i.e., 1 and 4). To increase the allocated bandwidth between node 0 and nodes 2 and 3, node 0 can be allocated additional time slots in which to communicate with nodes 2 and 3. Thus, for example, in time slot T4, node 0 can communicate again with node 2 and likewise with node 3 in time slot T5. Furthermore, in this example, the links between node 1 and node 4 may experience heavy traffic. Therefore, a schedule pattern can be used in which node 1 can communicate with node 4 in time slots T4 and T5 in addition to communicating with node 4 in time slot T2. While the other edge units 360 may have no need for additional bandwidth, router 50 can connect each edge unit 360 somewhere during each time slot and, therefore, unused capacity can exist is several of the links (see the shaded entries in Table 3). As is the case with the simple round robin schedule of Table 1, the weighted round robin schedule results in a virtual fully connected mesh between all edge units 360 (e.g., each node can communicate data to each other node at least once during a cycle). However, each link in the virtual full mesh using the schedule pattern of Table 3 gets allocated a variable portion of the maximum possible switch capacity.

Figure 5E:
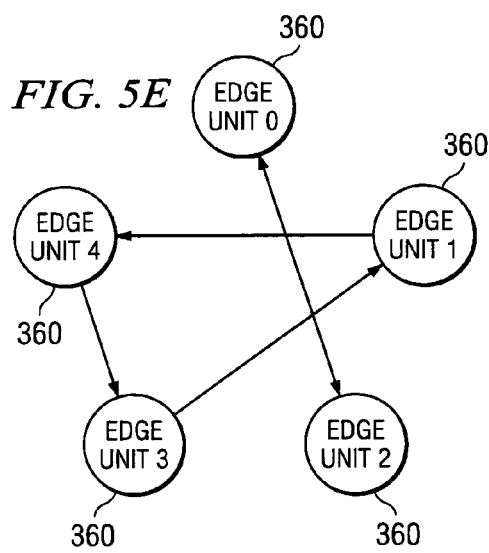
Figure 5F:
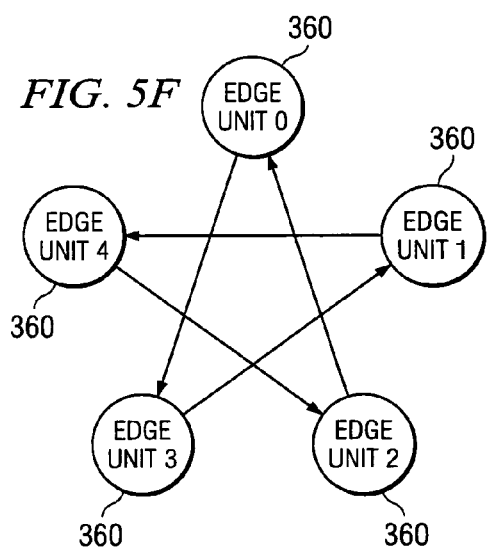

FIGS. 5A–5F illustrate the routing of data packets according to the weighted round robin schedule of Table 3. As shown in FIG. 5A, in time slot T0, node 0 (e.g., EU0) communicates data to node 1 (e.g., EU1), node 1 communicates data to node 2 (e.g., EU2), node 2 communicates data to node 3 (e.g., EU3), node 3 communicates data to node 4 (e.g., EU4), and node 4 communicates data to node 0. FIGS. 5B–5F illustrate the communication of data between the nodes in time slots T1–T5, respectively, according to the embodiment of a weighted round robin schedule of Table 3.

TABLE 4

Distribution of Link Capacity for Example Weighted Round Robin Schedule

| Node | 0 | 1 | 2 | 3 | 4 |
|---|---|---|---|---|---|
| 0 | — | 0.167 | 0.333 | 0.333 | 0.167 |
| 1 | 0.167 | — | 0.167 | 0.167 | 0.500 |
| 2 | 0.500 | 0.167 | — | 0.167 | 0.167 |
| 3 | 0.167 | 0.500 | 0.167 | — | 0.167 |
| 4 | 0.167 | 0.167 | 0.333 | 0.333 | — |

Table 4 illustrates that in the weighted round robin schedule pattern of Table 3, each link can be allocated a different portion of the available bandwidth. The shaded areas in Table 4 indicate the bandwidth excess of the requirements for a link. Thus, for example, node 2 communicates with node 0 for one-half of the cycle even if this capacity is not required for the communication of data packets between node 2 and node 0. Again, this capacity exists because router 50 can connect each edge unit 360 to another edge unit during a time slot. Note that the minimum core bandwidth that can be allocated to a link is reduced to 0.167 in Table 4 from 0.25 from Table 2. This occurs in the link between node 0 and node 1, for example, because node 0 only communicates data to node 1 for ⅙ of the cycle. However, assuming that the time slots of Table 2 and Table 3 are the same length, a six time slot schedule is 1.5 times longer than a four time slot schedule. Therefore, an allocated bandwidth of 0.167 in a six time slot schedule is equivalent to an allocated bandwidth of 0.250 in a four time slot schedule. In contrast, the available bandwidth that has been allocated for node 0 to communicate with node 2 has been raised from 0.25 to 0.333 (e.g., node 0 communicates with node 2 for three of the six time slots). By way of explication, Table 5 illustrates the allocated bandwidths in Table 4 normalized to the four time slot schedule of Table 2.

TABLE 5

Normalized Distribution of Link Capacity for Example Weighted Round Robin Schedule

| Node | 0 | 1 | 2 | 3 | 4 |
|---|---|---|---|---|---|
| 0 | — | 0.250 | 0.500 | 0.500 | 0.250 |
| 1 | 0.250 | — | 0.250 | 0.250 | 0.750 |
| 2 | 0.750 | 0.250 | — | 0.250 | 0.250 |
| 3 | 0.250 | 0.750 | 0.250 | — | 0.250 |
| 4 | 0.250 | 0.250 | 0.500 | 0.333 | — |

As can be understood from Tables 2 and 4, different schedule patterns can result in different allocations of bandwidth between nodes. Therefore, if there is an increase in traffic between two nodes (e.g., between node 2 and node 4), packet scheduler 42 can derive a new schedule pattern to accommodate the increased traffic (e.g., if the packet scheduler 42 replaced the schedule pattern of Table 1 with the schedule pattern of Table 3, there would be an increase in the bandwidth allocated between node 2 and node 4. In pure slot routing, each source node communicates data packets directly with a destination node via switch fabric 70. Thus, in the schedule pattern established according to Table 1, in time slot T0, node 0 will communicate data to node 1. If, however, all the data that arrives at node 0 bound for node 1 cannot be communicated to node 1 in time slot T0 due to bandwidth constraints, the excess traffic will be dropped. To compensate for dropped traffic, packet scheduler 42 can establish a new schedule pattern. However, the reconfiguration of the schedule pattern can cause delays at all links during which packets from links with heavy traffic may be dropped. Another problem arises with slot routing when there is only a small increase in traffic on one link. In such a case, it may be undesirable to derive a new schedule pattern to accommodate only a slight increase at one link as rescheduling can cause delays between all the nodes. However, in pure slot routing, without a new schedule pattern, the excess traffic, however small, may have to be dropped. Additionally, pure slot routing is limited because, if a fault occurs on the links between two nodes, traffic between those two nodes will be dropped until the fault is repaired.

To compensate for delays caused by packet scheduler 42 redetermining the scheduled pattern, small spikes in traffic or failures in the router/switch, the present invention can employ slot deflection routing. In slot deflection routing, data packets bound for a particular destination edge unit can be re-routed to an intermediate edge unit for subsequent routing to the destination edge unit. For example, consider again the five edge unit 360 embodiment of an active weighted round robin schedule as in Table 3 that provides the bandwidth allocation of Table 4. Slot deflection routing provides a means for responding to changes in traffic without computing a new schedule pattern to provide rapid response to transient traffic demands or failures in the router. Assume for the sake of explanation, the initial traffic distribution includes the following demand for data from EU2 to EU0, EU2 to EU3, and EU0 to EU3:

EU2→EU0: 0.167 (fill ratio 0.333)

EU2→EU3: 0.167 (fill ratio 1.000)

EU0→EU3: 0.167 (fill ratio 0.500)

As noted above, the initial traffic distribution asserts a demand of 0.167 on the links between EU2 and EU0 and the allocated capacity as illustrated in Table 4 is 0.500. This results in a fill ratio of 0.333 (i.e., the percentage required capacity over allocated capacity or 0.167 divided by 0.5). Additionally, the initial traffic demand requires all of the allocated bandwidth between EU2 and EU3 (i.e., a fill ratio of 1) and half the allocated bandwidth between EU0 and EU3 (i.e., a fill ratio of 0.5). In terms of FIGS. 5A–5F in time slot T0, EU2 can communicate all the data bound for EU3 from EU2 to EU3 (FIG. 5A), in time slot T2, EU0 can communicate all the data bound for EU3 from EU0 to EU3 (FIG. 5C), and additionally in time slot T2, EU2 can communicate all the data bound for EU0 to EU2 (FIG. 5C).

Now, consider a doubling in traffic from edge EU2 to EU3 with the same traffic demands between EU2 and EU0, and EU0 and EU3 as in the initial traffic pattern. Since the links between EU2 and EU3 have only an allocated capacity of 0.167, but the traffic demand has jumped to 0.333, in pure slot routing, the additional 0.167 traffic demand would have to be dropped until a new schedule pattern could be computed by packet scheduler 42. Using slot deflection routing, however, the new traffic (e.g., the additional 0.167) bound for EU3 from EU2, can be handled without dropping packets and without requiring a new schedule pattern to be calculated.

Table 4 shows that the links between EU2 and EU0 have the capacity of 0.5, but the traffic distribution only asserts the demand of only 0.167. Thus, the path from EU2 to EU0 is being underutilized and can handle an additional 0.333. Similarly, the link between EU0 and EU3 is underutilized as it has an allocated capacity of 0.333, but again, there is only a demand of 0.167. By routing the new traffic from EU2 through EU0 to EU3, the following bandwidth demand can be realized.

EU2→EU0: 0.333 (fill ratio 0.667)

EU2→EU3: 0.167 (fill ratio 1.000)

EU0→EU3: 0.333 (fill ratio 1.000)

Figure 6:
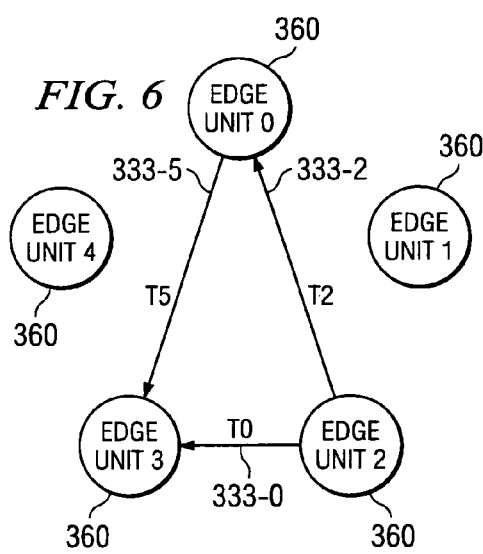
FIG. 6 illustrates one embodiment of slot deflection routing according to the present invention.

FIG. 6 illustrates routing of data between edge unit E2 and E3 according to one embodiment of slot deflection routing. As shown in FIG. 6 in time slot T0 of the schedule pattern depicted in Table 3, traffic corresponding to 0.167 of the router's bandwidth (e.g., half the demand of traffic between EU2 to EU3) can be routed directly from EU2 to EU3 (depicted by link 333-0), giving a fill ratio of one. In time slot T2, the remainder of the traffic bound to EU3 from EU2 (e.g., the remaining 0.167 traffic demand) could be routed to EU0 from EU2 (represented by link 333-2). Again, this would cause an increase in traffic demand of 0.167 over the original 0.167 demand between EU2 and EU0 giving a total traffic demand of 0.333 and a fill ratio of 0.667 (i.e., 0.333 divided by the allocated capacity of 0.5). Finally, in time slot T5, the 0.167 traffic demand that was rerouted from EU2 to EU0 (rather than being routed from EU2 to EU3) can now be routed from EU0 to EU3 (represented by link 333-5), giving a total traffic demand of 0.333 between EU0 and EU3, or fill ratio of 1. Note that the fill ratio of each link has increased while no change in the schedule pattern is required to respond to an increase in traffic and to avoid dropping any packets. As there is less excess capacity in router 50, slot deflection routing increases the efficiency of router 50.

FIG. 6 illustrates routing of data through time. In other words, the communication of data during several time slots is shown in the same figure. FIG. 6 can be compared to FIGS. 5A–5F, which show the communication of data during discrete time slots. For example, In FIG. 6, the communication of data over link 333-2 which is established in time slot T2, can correspond to the communication of data between EU2 and E0 seen in FIG. 5C, the communication of data over link 333-5 can correspond to the communication of data between EU0 and E3 illustrated in FIG. 5F and so on. Thus, FIG. 6 illustrates that, in slot deflection routing, data can be rerouted or deflected to an intermediate edge unit based on an existing schedule pattern.

In one embodiment of the present invention the re-routing of data packets to an intermediate edge unit (e.g., EU0) can be determined on an ad hoc basis depending on the traffic demands at any given time. In another embodiment of the present invention, the best path can be predetermined. Thus, the traffic can be automatically re-routed to the intermediate edge unit based on pre-determined routing instructions.

Figure 7:
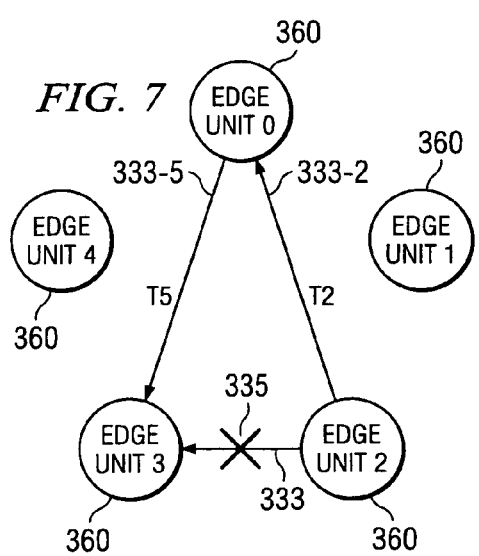
FIG. 7 illustrates one embodiment of fault management using an embodiment of slot deflection routing according to the present invention.

In addition to handling increases in traffic demand, slot deflection routing can be used for more efficient fault management and can also provide a means to rapidly respond to certain failures in the core. FIG. 7 illustrates routing of data in response to a fault according to one embodiment of slot deflection routing. Once again assuming initial traffic distribution is as follows:

EU2→EU0: 0.167 (fill ratio 0.333)

EU2→EU3: 0.167 (fill ratio 1.000)

EU0→EU3: 0.167 (fill ratio 0.500)

Now consider a failure in the link from EU2 to EU3 (indicated by fault 335). Again, for the slot routing case there would be no option except to drop packets until the fault between EU2 and EU3 is fixed. In contrast, with slot deflection routing, traffic between EU2 and EU3 can be re-routed to an intermediate edge unit in order to prevent the dropping of packets. Once again, from Table 4, the link from EU2 to EU0 has an allocated capacity of 0.5, but only 0.167 of this is being used (i.e., a fill ratio of 0.333). Additionally, the link from EU0 to EU3 is also underutilized (i.e., under the initial traffic condition it has a fill ratio of 0.5). Because these links are underutilized, traffic that would normally travel across the failed link (e.g., from EU2 to EU3) can be re-routed from EU2 to EU0 in time slot T2 (represented by link 333-2), giving a traffic demand of 0.333, and subsequently, from EU0 to EU3 in time slot T5 (represented by link 333-5), also giving a traffic demand of 0.333. Thus, the traffic demand after a link failure between EU2 and EU3 in a router 50 employing slot deflection routing would be:

EU2→EU0: 0.333 (fill ratio 0.667)

EU2→EU3: 0.000 (fill ratio 0.000)

EU0→EU3: 0.333 (fill ratio 1.000)

Once again, the fill ratio of each link has increased, while no change in schedule pattern is required to respond to the failed link. Thus, slot deflection routing can be used to quickly and efficiently compensate for failures within a router/switch. It should be noted that while the previous example of slot deflection routing included deflection of data packets through only one intermediate edge unit 360, the data packets could, in fact, be deflected through several edge units. Thus, for example, a portion of the data going from EU2 to EU3 could be deflected to EU3 through EU0, while another portion could be deflected to EU3 through EU4. It should also be noted that when data packets are routed to parallel edge units, in this manner, they may not necessarily be sent to the intermediate edge units during the same time slot of a cycle. Additionally, the data packet could be deflected to several intermediate edge units in series. For example, data packets bound for EU3 from EU2 would be routed first to EU4, then to EU1, and finally to the destination EU3. It should also be noted that in both FIGS. 6 and 7, data was deflected through intermediate edge unit EU0 during time slot T2. However, as can be understood from Table 3, EU2 could also have deflected data to EU0 during time slots T4 and T5, and EU0 could have forwarded the deflected data to EU3 in time T5, as well as the previously noted T2.

Slot deflection routing allows a router/switch to internally reroute data packets to intermediate edge units, thus allowing the router/switch to effectively handle transient and long-term increases in traffic and faults within the router, thereby increasing the efficiency and bandwidth of the router/switch. It should be noted that the schedule patterns provided in Tables 2 and 4 are exemplary only and the particular schedule pattern for a router can be based on actual traffic conditions on the router, which could be based on statistical estimates of the traffic conditions at the router.

Although the present invention has been described in detail, it should be understood that various changes, substitutions and alterations can be made hereto without departing from the spirit and scope of the invention as described by the appended claims.

What is claimed is:

1. A method for routing optical data packets comprising:
   establishing a schedule pattern comprising a plurality of time slots, wherein the schedule pattern includes at least one time slot in which an ingress edge unit can communicate with a destination egress edge unit, at least one time slot in which an ingress edge unit can communicate with an intermediate edge unit, and at least one time slot in which the intermediate edge unit can communicate with the destination egress edge unit:
   receiving a data packet at the ingress edge unit;
   determining if the schedule pattern allocates sufficient bandwidth to communicate the data packet to the destination egress edge unit without deflection;
   if sufficient bandwidth has been allocated, communicating the data packet to the destination egress edge unit; and
   if sufficient bandwidth has not been allocated:
      deflecting the data packet to the intermediate edge unit; and
      communicating the data packet from the intermediate edge unit to the destination egress edge unit
   determining the current traffic demand; and
   if sufficient bandwidth has not been allocated to communicate the data packet to the destination egress edge unit without deflection under the current traffic demand, updating the schedule pattern to increase the allocated bandwidth between the ingress edge unit and the destination egress edge unit.

2. The method of claim 1, further comprising:
   predetermining a deflection route for incoming data packets arriving at the ingress edge unit based on the schedule pattern; and deflecting the data packet based on the predetermined deflection route.

3. The method of claim 1, wherein the step of deflecting the data packet to the intermediate edge unit further comprises deflecting the data packet to a plurality of intermediate edge units in parallel.

4. The method of claim 1, wherein the step of deflecting the data packet to the intermediate edge unit further comprises deflecting the data packet to a plurality of intermediate edge units in series.

5. The method of claim 1, further comprising
determining if there is a fault between the ingress edge unit and the destination egress edge unit; and
if there is a fault, deflecting the data packet to the intermediate edge unit.

6. The method of claim 5, further comprising deriving a new schedule pattern to compensate for the fault.

7. A method for routing optical data comprising:
establishing a schedule pattern comprising a plurality of time slots, wherein the schedule pattern includes at least one time slot in which an ingress edge unit can communicate with a destination egress edge unit, at least one time slot in which the ingress edge unit can communicate with an intermediate edge unit, and at least one time slot in which the intermediate edge unit can communicate with the destination egress edge unit;
receiving a plurality of data packets bound for the same destination edge unit;
determining if the schedule pattern allocates sufficient bandwidth to communicate the plurality of data packets to the destination egress edge unit without deflection;
if sufficient bandwidth has been allocated, communicating the plurality of data packets to the destination egress edge unit; and
if sufficient bandwidth has not been allocated:
deflecting at least a portion of the plurality of data packets to the intermediate edge unit; and
communicating the at least a portion of the plurality of data packets from the intermediate edge unit to the destination egress edge unit
determining the current traffic demand, wherein the schedule pattern is based on expected traffic; and
if sufficient bandwidth has not been allocated to communicate the plurality of data packets to the destination egress edge unit without deflection under the current traffic demand, updating the schedule pattern to increase the allocated bandwidth between the ingress edge unit and the destination egress edge unit.

8. The method of claim 7, further comprising:
predetermining a best deflection route for incoming data packets arriving at the ingress edge unit based on the schedule pattern; and
deflecting the at least a portion of the plurality of data packets based on the predetermined deflection route.

9. The method of claim 7, wherein the step of deflecting at least a portion of the plurality of data packets further comprises deflecting the at least a portion of the plurality of data packets to a plurality of intermediate edge units in parallel.

10. The method of claim 7, wherein the step of deflecting at least a portion of the plurality of data packets further comprises deflecting the at least a portion of the plurality of data packets to a plurality of intermediate edge units in series.

11. The method of claim 7, further comprising:
determining if a fault exists between the ingress edge unit and the destination egress edge unit; and
if the fault exists:
deflecting the plurality of data packets to at least one intermediate edge unit; and
communicating the plurality of data packets from the at least one intermediate edge unit to the destination egress edge unit.

12. A system for routing optical data packets comprising:
a destination egress edge unit;
an intermediate edge unit;
an ingress edge unit, wherein the ingress edge unit receives an optical data packet;
a scheduler which establishes a schedule pattern, wherein the schedule pattern comprises a series of time slots and wherein the schedule pattern includes at least one time slot in which the ingress edge unit can communicate with the destination egress edge unit, at least one time slot in which the ingress edge unit can communicate with the intermediate edge unit, and at least one time slot in which the intermediate edge unit can communicate with the destination egress edge unit;
a core controller operable to:
determine if the schedule pattern allocates sufficient bandwidth for the ingress edge unit to communicate the destination egress edge unit without deflection;
if sufficient bandwidth has not been allocated, route the data packet from the ingress edge unit to the intermediate edge unit; and
route the data packet from the intermediate edge unit to the destination egress edge unit; and
an optical switch core, and wherein the core controller is further operable to:
configure the switch core so that the ingress edge unit communicates with the destination egress edge unit according to the schedule pattern;
configure the switch core so that the ingress edge unit communicates with the intermediate edge unit according to the schedule pattern; and
configure the switch core so that the intermediate edge unit communicates with the destination egress edge unit according to the switch core.

13. The system of claim 12, wherein the core controller is further operable to:
if sufficient bandwidth has been allocated for the ingress edge unit to communicate with the destination egress edge unit without deflection, prompt the ingress edge unit to communicate the data packet to the destination egress edge unit in the at least one time slot in which the ingress edge unit can communicate with the destination egress edge unit; and
if sufficient bandwidth has not been allocated:
prompt the ingress edge unit to communicate the data packet to the intermediate edge unit in the at least one time slot in which the ingress edge unit can communicate with the intermediate edge unit; and
prompt the intermediate edge unit to communicate the data packet to the destination egress edge unit in the at least one time slot in which the intermediate edge unit can communicate with the destination egress edge unit.

14. The system of claim 12, wherein the core controller is further operable to:
predetermine the best deflection route based on the schedule pattern; and route the data packet to the intermediate edge unit based on the schedule pattern.

15. The system of claim 12, further comprising a plurality of intermediate edge units and wherein the core controller is further operable to route the data packet to the plurality of intermediate edge units in parallel.

16. The system of claim 12, further comprising a plurality of intermediate edge units and wherein the core controller is further operable to route the data packet to the plurality of intermediate edge units in series.

17. The system of claim 12, wherein the scheduler is operable to establish the schedule pattern based on expected traffic.

18. The system of claim 16, wherein the core controller is further operable to determine the current traffic and wherein the scheduler is further operable to update the schedule pattern based on the current traffic.

19. A system for routing optical data packets, comprising:
a destination egress edge unit;
an intermediate edge unit;
an ingress edge unit, wherein the ingress edge unit receives an optical data packet;
a scheduler which establishes a schedule pattern, wherein the schedule pattern comprises a series of time slots and wherein the schedule pattern includes at least one time slot in which the ingress edge unit can communicate with the destination egress edge unit, at least one time slot in which the ingress edge unit can communicate with the intermediate edge unit, and at least one time slot in which the intermediate edge unit can communicate with the destination egress edge unit;
a core controller operable to:
determine if the schedule pattern allocates sufficient bandwidth for the ingress edge unit to communicate the destination egress edge unit without deflection;
if sufficient bandwidth has not been allocated, route the data packet from the ingress edge unit to the intermediate edge unit; and
route the data packet from the intermediate edge unit to the destination egress edge unit; and
a plurality of intermediate edge units, wherein the core controller is further operable to route the data packet to the plurality of intermediate edge units in series and determine the current traffic, and wherein the scheduler is further operable to update the schedule pattern based on the current traffic.

20. A system for routing optical data packets comprising:
a destination egress edge unit;
an intermediate edge unit;
an ingress edge unit, wherein the ingress edge unit receives an optical data packet;
a scheduler which establishes a schedule pattern, wherein the schedule pattern comprises a series of time slots and wherein the schedule pattern includes at least one time slot in which the ingress edge unit can communicate with the destination egress edge unit, at least one time slot in which the ingress edge unit can communicate with the intermediate edge unit, and at least one time slot in which the intermediate edge unit can communicate with the destination egress edge unit;
a core controller operable to:
determine if the schedule pattern allocates sufficient bandwidth for the ingress edge unit to communicate the destination egress edge unit without deflection;
if sufficient bandwidth has not been allocated for the ingress edge unit to communicate the destination egress edge unit without deflection,
route the data packet from the ingress edge unit to the intermediate edge unit; and
route the data packet from the intermediate edge unit to the destination egress edge unit;
if sufficient bandwidth has been allocated for the ingress edge unit to communicate with the destination egress edge unit without deflection,
prompt the ingress edge unit to communicate the data packet to the destination egress edge unit in the at least one time slot in which the ingress edge unit can communicate with the destination egress edge unit; and
an optical switch core, and wherein the core controller is further operable to:
configure the switch core so that the ingress edge unit communicates with the destination egress edge unit according to the schedule pattern;
configure the switch core so that the ingress edge unit communicates with the intermediate edge unit according to the schedule pattern; and
configure the switch core so that the intermediate edge unit communicates with the destination egress edge unit according to the switch core;
wherein the core controller is further operable to:
if sufficient bandwidth has not been allocated:
prompt the ingress edge unit to communicate the data packet to the intermediate edge unit in the at least one time slot in which the ingress edge unit can communicate with the intermediate edge unit; and
prompt the intermediate edge unit to communicate the data packet to the destination egress edge unit in the at least one time slot in which the intermediate edge unit can communicate with the destination egress edge unit.

* * * * *